US009810089B2

(12) United States Patent
Kubota et al.

(10) Patent No.: US 9,810,089 B2
(45) Date of Patent: Nov. 7, 2017

(54) POWER GENERATION SYSTEM (71) Applicant: MITSUBISHI HEAVY INDUSTRIES, LTD., Tokyo (JP)

(72) Inventors: Yutaka Kubota, Tokyo (JP); Toyotaka Hirao, Tokyo (JP); Takao Sakurai, Tokyo (JP); Naoki Kobayashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 237 days.

(21) Appl. No.: 14/653,465

(22) PCT Filed: Dec. 27, 2013

(86) PCT No.: PCT/JP2013/085200
§ 371 (c)(1),
(2) Date: Jun. 18, 2015

(87) PCT Pub. No.: WO2014/104335
PCT Pub. Date: Jul. 3, 2014

(65) Prior Publication Data
US 2015/0345340 A1 Dec. 3, 2015

(30) Foreign Application Priority Data
Dec. 28, 2012 (JP) ................. 2012-288962

(51) Int. Cl.
*F01D 15/10* (2006.01)
*F01K 13/02* (2006.01)
(Continued)

(52) U.S. Cl.
CPC ............ *F01D 15/10* (2013.01); *F01D 21/00* (2013.01); *F01K 13/02* (2013.01); *F01K 23/02* (2013.01);
(Continued)

(58) Field of Classification Search
CPC .......... F01K 13/02; F01D 21/00–21/20; F01D 15/10; F01D 19/00; F01D 19/02; F01D 17/00; F02C 9/00–9/58
(Continued)

(56) References Cited

U.S. PATENT DOCUMENTS 4,445,180 A * 4/1984 Davis ................. F01D 17/24
290/40 R
4,455,614 A * 6/1984 Martz ................. F01K 23/10
290/40 R
(Continued)

FOREIGN PATENT DOCUMENTS

CN 102472118 5/2012
DE WO 2011018404 A1 * 2/2011 ............. F01K 13/02
(Continued)

OTHER PUBLICATIONS

Extended European Search Report dated Oct. 25, 2016 in corresponding European Application No. 13869379.1.
(Continued)

*Primary Examiner* — Mark Laurenzi
*Assistant Examiner* — Xiaoting Hu
(74) *Attorney, Agent, or Firm* — Wenderoth, Lind & Ponack, L.L.P.

(57) ABSTRACT

This power generation system (20A) includes a plurality of power generation units (50A, 50B, 50C, . . . ) which are provided in parallel, wherein each of the power generation units (50A, 50B, 50C, . . . ) includes an expander (26) configured to be rotated by a working medium, a power generator (28) configured to generate power through rotation of the expander (26), a rectifier (29), a medium circulation system (22) configured to pump the working medium into the expander (26), a relay (70) configured to interrupt power between the power generator (28) and an external power
(Continued)

system (30), an operating unit (40A, 40B) configured to be operated when maintenance starts, and a relay driving unit (71) configured to interrupt power between the power generator (28) and the external power system (30) by the relay (70) when the operating unit (40A, 40B) has been operated.

9 Claims, 4 Drawing Sheets

(51) Int. Cl.
    *F01K 23/02*     (2006.01)
    *F01D 21/00*     (2006.01)
    *F02C 9/00*     (2006.01)
    *H02J 3/38*     (2006.01)
    *F02C 7/00*     (2006.01)
    *F01D 21/06*     (2006.01)

(52) U.S. Cl.
    CPC ............... *F02C 7/00* (2013.01); *F02C 9/00* (2013.01); *H02J 3/38* (2013.01); *F01D 21/06* (2013.01)

(58) Field of Classification Search
    USPC .................................................. 60/646, 657
    See application file for complete search history.

(56) References Cited

U.S. PATENT DOCUMENTS

| | | | | |
|---|---|---|---|---|
| 5,860,279 A | * | 1/1999 | Bronicki | F01K 23/04 165/85 |
| 2004/0146394 A1 | * | 7/2004 | Turchetta | F01D 15/10 415/13 |
| 2009/0189394 A1 | * | 7/2009 | DeAngeles | F03D 7/0224 290/44 |
| 2010/0043438 A1 | * | 2/2010 | Barber | F01D 21/00 60/646 |
| 2012/0151922 A1 | * | 6/2012 | Koller | F01D 21/02 60/646 |
| 2012/0312021 A1 | * | 12/2012 | Tsuboi | F01K 13/02 60/667 |
| 2013/0328310 A1 | * | 12/2013 | Dyer | F01D 15/10 290/52 |
| 2014/0252767 A1 | * | 9/2014 | Hashimoto | F01K 13/02 290/43 |

FOREIGN PATENT DOCUMENTS

| | | |
|---|---|---|
| JP | 61-177133 | 8/1986 |
| JP | 2001-197789 | 7/2001 |
| JP | 2006-299996 | 11/2006 |
| JP | 2006-313048 | 11/2006 |
| JP | 2006-313049 | 11/2006 |
| JP | 2007-162689 | 6/2007 |
| JP | 2008-95691 | 4/2008 |
| JP | 2008-175108 | 7/2008 |
| WO | 2011/018404 | 2/2011 |

OTHER PUBLICATIONS

International Search Report dated Mar. 4, 2014 in corresponding International Application No. PCT/JP2013/085200.
Written Opinion of the International Searching Authority dated Mar. 4, 2014 in corresponding International Application No. PCT/JP2013/085200.
First Office Action dated Nov. 4, 2015 in Chinese Application No. 201380064487.3 (with English translation).

* cited by examiner

POWER GENERATION SYSTEM

TECHNICAL FIELD

The present invention relates to a power generation system in which a plurality of power generation units are provided in parallel.

Priority is claimed on Japanese Patent Application No. 2012-288962, filed Dec. 28, 2012, the content of which is incorporated herein by reference.

BACKGROUND ART

Figure 4:
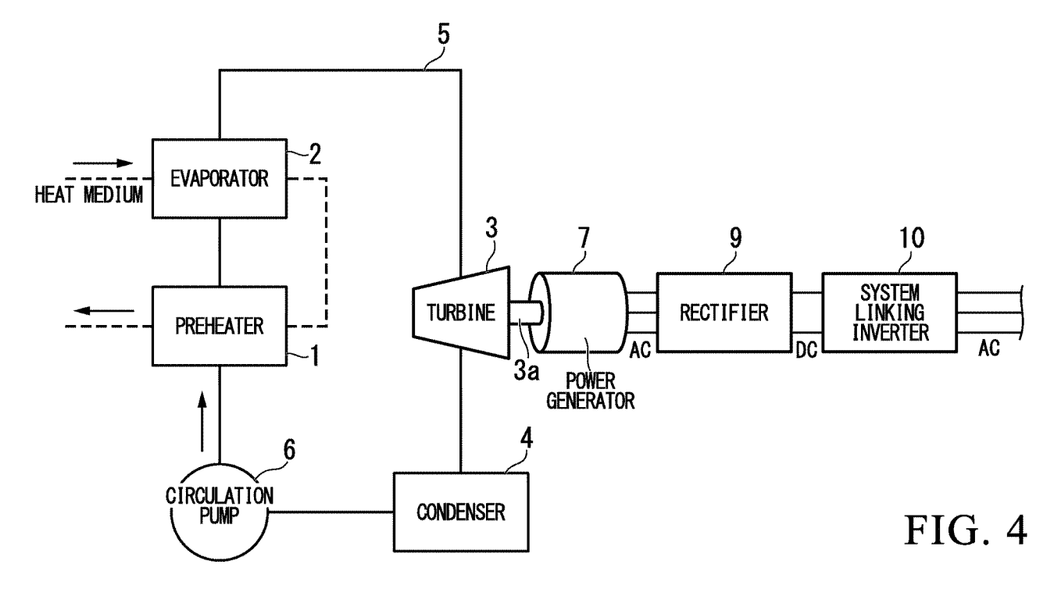
FIG. 4 is a diagram illustrating a configuration of a conventional power generation system.

In recent years, from the viewpoint of effective use of energy, environmental preservation, and the like, a Rankine cycle type power generation system has been studied as a system for performing power generation using exhaust heat from ships, factories, gas turbines, and the like, terrestrial heat, solar heat, temperature difference between cooler deep and warmer shallow ocean waters, and the like as a heat source (for example, see Patent Literatures 1 to 3). In this case, when the above-described heat sources are used, a medium having a lower boiling point than water, for example, an organic fluid such as a fluorocarbon-based medium, is used as the medium. In this power generation system, as illustrated in FIG. 4, a medium is circulated through a circulation pump 6 within a cycle circuit 5 having a preheater 1, an evaporator 2, a turbine 3, and a condenser 4. Then, after recovering heat from the above-described heat source, the heat medium is pumped into the evaporator 2, heat exchange with the medium is performed, and the heat medium is evaporated and gasified. In addition, the heat medium passing through the evaporator 2 preheats the medium in the preheater 1 provided in a previous stage of the evaporator 2.

The gasified medium is expanded in the turbine 3 to rotate and drive the driving shaft 3a and drive the power generator 7. The medium expanded in the turbine 3 is condensed by the condenser 4 and circulated to the circulation pump 6.

When the power generator 7 is driven, an alternating current (AC) to be output is converted into a direct current (DC) by the rectifier 9. Further, the DC is reconverted into an AC by a system linking inverter 10 and the AC is externally output as generated power.

In an organic Rankine cycle type power generation system, a change amount in heat energy output from the heat source is large. Although it is only necessary to change the number of rotations of the power generator 7 in order to cope with the large change amount, it is necessary to consider the efficiency of the turbine 3 in a configuration in which the turbine 3 serves as a drive source of the power generator 7. It is preferable to operate the turbine 3 in a rotation region having high operation efficiency. Therefore, when the number of rotations of the turbine 3 and the power generator 7 is intended to be changed based on an output energy change of the heat source, a change width is limited.

Therefore, a technique for coping with a large output energy change of the heat source by providing a plurality of power generation units having the turbine 3 and the power generator 7 and changing the number of power generation units to be operated is also disclosed in Patent Literatures 1 to 3.

CITATION LIST

Patent Literatures

[Patent Literature 1]
  Japanese Unexamined Patent Application, First Publication No. 2006-299996
[Patent Literature 2]
  Japanese Unexamined Patent Application, First Publication No. 2006-313048
[Patent Literature 3]
  Japanese Unexamined Patent Application, First Publication No. 2006-313049

SUMMARY OF INVENTION

Technical Problem

In the above-described power generation system, for example, it is necessary to perform maintenance such as inspection or replacement of a consumable part such as a bearing of a driving shaft 3a of the turbine 3.

At this time, in order to improve an operating rate of the power generation system, it is preferable to perform maintenance of the turbine 3 by stopping a power generation unit on which maintenance needs to be performed among a plurality of power generation units and operate turbines 3 and power generators 7 of the other power generation units.

However, in this case, because the entire power generation system is not shut down, a current is applied from outside to the turbine 3 and the rectifier 9 or the like of the power generator 7 even in the stopped power generation unit and an operator needs to perform an operation in consideration thereof Therefore, in the turbine 3 and the power generator 7 of the stopped power generation unit, the interruption of power supply through a switch, a relay, or the like is considered. However, it is necessary to operate the switch or relay and there is a possibility of forgetting an operation, an operational error, or the like. In addition, for example, when a medium having a lower boiling point than water is used, the operator is more likely to carelessly touch a device and a possibility of forgetting the operation, the operational error, or the like as mentioned above is higher because sufficient attention may not be paid to a high temperature due to the fact that the temperature of the device is kept relatively low. Therefore, the present invention provides a power generation system capable of interrupting power supply for a power generation unit on which maintenance is performed when the maintenance of the power generation unit is performed in a state in which another power generation unit has been operated in a configuration in which a plurality of power generation units are provided.

Solution to Problem

According to a first aspect of the present invention, a power generation system includes a plurality of power generation units which are provided in parallel to an external power system, wherein each of the power generation units includes an expander configured to be rotated by a working medium; a power generator configured to generate power through the rotation of the expander; a rectifier configured to rectify the power generated by the power generator and output the rectified power to the external power system; a medium distribution system configured to pump the working medium into the expander; a relay configured to interrupt power between the power generator and the external power system; an operating unit configured to be operated when maintenance of the power generation unit starts; and a relay driving unit configured to interrupt power between the power generator and the external power system by the relay when the operating unit has been operated.

In this power generation system, the relay driving unit switches the relay to interrupt power between the relay and the external power system based on an operation of the operating unit to be reliably operated when maintenance that is performed in each power generation unit starts. Thereby, during the maintenance, power supply to the power generation unit on which the maintenance is performed is able to be interrupted while the other power generation units are continuously operated.

Here, the relay may be provided between the rectifier and the external power system and provided between the power generator and the rectifier.

The power generation system according to the second aspect of the present invention may have any configuration as long as the power generator is driven to generate power by the expander.

For example, the power generation system may have configuration in which the medium distribution system is a medium circulation circuit configured to circulate the working medium and the medium circulation circuit includes a circulation pump configured to pressurize the working medium and circulate the pressurized working medium through the medium circulation circuit; an evaporator configured to heat and evaporate the pressurized working medium using an external heat source; the expander configured to be rotated using the working medium evaporated by the evaporator; and a condenser configured to condense the working medium discharged from the expander.

Preferably, the power generation system according to a third aspect of the present invention further includes a first on-off valve provided on an upstream side of a flowing direction of the working medium with respect to a maintenance target device including at least one of the circulation pump, the evaporator, the expander, and the condenser in the medium circulation circuit to interrupt the distribution of the working medium; and a second on-off valve provided on a downstream side of the flowing direction of the working medium with respect to the maintenance target device in the medium circulation circuit to interrupt the distribution of the working medium, wherein at least one of the first on-off valve and the second on-off valve is the operating unit.

According to the power generation system, the medium is recovered between the first on-off valve and the second on-off valve after the first on-off valve and the second on-off valve are closed when the maintenance is performed on the maintenance target device.

Accordingly, because the first on-off valve or the second on-off valve is closed to recover the working medium in the maintenance, at least one of the first and second on-off valves serves as the operating unit and therefore power interruption is performed by the relay.

In addition, according to the above-described power generation system, after the medium between the first on-off valve and the second on-off valve is recovered, the maintenance of the maintenance target device is performed. After the completion of the maintenance, a space between the first on-off valve and the second on-off valve is evacuated and the medium is filled between the first on-off valve and the second on-off valve.

Thereby, when the maintenance is performed on the maintenance target device, the medium of the entire medium circulation circuit is unnecessary to be extracted and only the medium between the first on-off valve and the second on-off valve is necessary to be extracted. In addition, it is only necessary to perform evacuation when the medium is filled after maintenance between the first on-off valve and the second on-off valve.

Here, the maintenance target device in the power generation unit may include at least one of the circulation pump, the evaporator, the expander, and the condenser, and the maintenance target device may include two or more thereof. In addition, the first and second on-off valves may be provided for two or more maintenance target devices.

According to a fourth aspect of the present invention, at least one of the circulation pump and a pump configured to feed a heat medium from the external heat source to the evaporator may serve as the operating unit.

In order to stop the expansion of the working fluid in the expander in the maintenance of the power generation system, a circulation pump for circulating the working fluid and a pump for feeding a heat medium for evaporating the working medium to an evaporator are stopped. Therefore, by designating at least one of the circulation pump and the pump as the operating unit, power interruption is performed by the relay.

The power generation system according to a fifth aspect of the present invention may further include: a cooling fan configured to cool the condenser; a fan driving source configured to drive the cooling fan; and a second relay configured to interrupt power between the fan driving source and a power supply of the fan driving source, wherein the relay driving unit interrupts the power between the fan driving source and the power supply of the fan driving source by the second relay when the operating unit has been operated.

Thereby, when the cooling fan for cooling the condenser is provided, an operation of the cooling fan is also able to be stopped in the maintenance of the power generation unit.

Advantageous Effects of Invention

According to the above-described power generation system, power supply to a power generation unit is able to be interrupted when maintenance of a device is performed and a maintenance operation is able to be safely performed.

DESCRIPTION OF EMBODIMENTS

Hereinafter, embodiments of a power generation system according to the present invention will be described with reference to the accompanying drawings. However, the present invention is not limited to these embodiments.

(First Embodiment)

Figure 1:
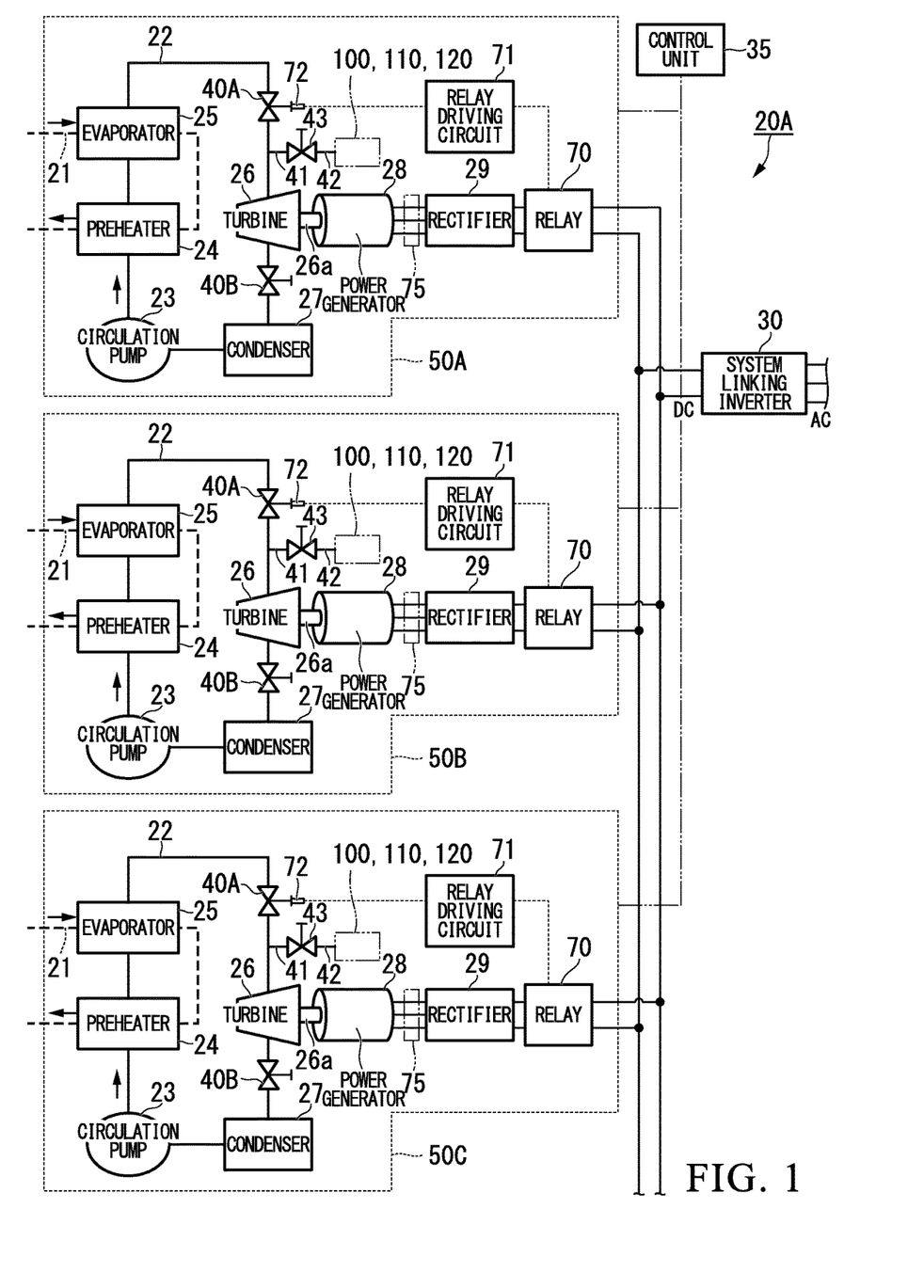
FIG. 1 is a diagram illustrating a configuration of a power generation system according to a first embodiment of the present invention.

As illustrated in FIG. 1, a power generation system 20A includes a plurality of power generation units 50A, 50B, 50C, . . .

Each of the power generation units 50A, 50B, 50C, . . . includes a heat medium circuit 21 into which a heat medium is pumped from a heat source such as exhaust heat from ships, factories, gas turbines, and the like, terrestrial heat, solar heat, or temperature difference between cooler deep and warmer shallow ocean waters and a medium circulation circuit (medium distribution system) 22 for circulating the medium (working medium) for obtaining heat energy by performing heat exchange with the heat medium of the heat medium circuit 21.

Here, for example, a fluorocarbon-based medium such as HFC-134a, HFC-245fa, HFO-1234yf, or HFO-1234ze is able to be used as the medium of the medium circulation circuit 22.

The heat medium circuit 21 supplies a heat medium such as steam or water (hot water) obtained by recovering heat from the heat source.

The medium circulation circuit 22 includes a circulation pump 23, a preheater 24, an evaporator 25, a turbine (expander) 26, and a condenser 27.

The circulation pump 23 causes the medium to be circulated within the medium circulation circuit 22 so that the medium sequentially passes through the preheater 24, the evaporator 25, the turbine 26, and the condenser 27 by compressing the medium and outputting the compressed medium.

The preheater 24 and the evaporator 25 are configured to perform heat exchange between the heat medium of the heat medium circuit 21 and the medium of the medium circulation circuit 22. The evaporator 25 heats and evaporates the pressed medium through the heat exchange with a heat medium (external heat source) and the preheater 24 preheats the medium through the residual heat of the heat medium passing through the evaporator 25.

The turbine 26 rotates and drives the driving shaft 26a around an axis of the driving shaft 26a by expanding an internally introduced medium inside a turbine chamber. A rotator (not illustrated) of the power generator 28 is connected to the driving shaft 26a and the rotator (not illustrated) is rotated and driven to face a stator (not illustrated) of the power generator 28. Thereby, the power generator 28 outputs an AC.

The AC output from the power generator 28 is rectified by a rectifier 29 and converted into a DC.

Rectifiers 29 of the plurality of power generation units 50A, 50B, 50C, . . . described above are connected in parallel to one system linking inverter 30 connected to the external power system. The DC output from each rectifier 29 is re-converted into the AC by the system linking inverter 30 and the AC is output to an external power transmission network as generated power.

In each of the plurality of power generation units 50A, 50B, 50C, . . . , an on-off valve (first on-off valve) 40A and an on-off valve (second on-off valve) 40B are provided on the upstream and downstream sides of a device, for example, the turbine 26, serving as a maintenance target in the medium circulation circuit 22.

In addition, in the medium circulation circuit 22, a port pipe 41 is provided between the on-off valves 40A and 40B, a tip of the port pipe 41 is configured as a service port 42 communicable with the medium circulation circuit 22 and connectable to a device for removing and inserting the medium in the medium circulation circuit 22. In addition, an on-off valve 43 is formed in the port pipe 41.

In addition, in each of the power generation units 50A, 50B, 50C, . . . , a relay 70 for connecting and disconnecting power between the rectifier 29 and the system linking inverter 30 is provided between the rectifier 29 and the system linking inverter 30.

The relay 70 is configured so that the connection and the disconnection of an electric path is switched by the relay driving circuit (relay driving unit) 71 in linkage with the on-off valves 40A and 4013 to be operated when maintenance starts. In at least one of the on-off valves 40A and 40B, a sensor 72 for detecting whether the valve is in a closed state or an open state is provided.

The relay driving circuit 71 receives a detection signal of the sensor 72, opens the relay 70 when the signal is transitioned from the closed state to the open state, and interrupts power between the rectifier 29 and the system linking inverter 30. In addition, when the detection signal from the sensor 72 is transitioned from the open state to the closed state, the relay 70 is closed and power is connected between the rectifier 29 and the system linking inverter 30.

In the above-described power generation system 20A, the control unit 35 is provided. This control unit 35 controls heat medium supply of the heat medium circuit 21 and operations of the circulation pump 23 and the on-off valves 40A, 40B, and 43 of the medium circulation circuit 22 and monitors an operation state or the like of each device configuring the power generation system 20A.

Through control of the control unit 35, this power generation system 20A can change the number of units to be operated (that is, the number of turbines 26 to be operated) to change a power generation amount step by step by selectively operating the plurality of power generation units 50A, 50B, 50C, . . . based on an input heat energy amount of a heat medium fed from the heat medium circuit 21 or a required power amount in an output side.

In the above-described power generation system 20A, in the maintenance of the turbine 26 of one of the plurality of power generation units 50A, 50B, 50C, . . . , the unit (for example, the power generation unit 50A) first stops the supply of the heat medium through a pump (not illustrated) or an on-off valve (not illustrated) of the heat medium circuit 21 and stops the circulation pump 23 of the medium circulation circuit 22. At this time, the operations of the power generation units 50B, 50C, . . . excluding the power generation unit 50A of the maintenance target among the plurality of power generation units 50A, 50B, 50C, . . . can continue.

Next, the on-off valves 40A and 40B are closed. Thereby, the medium circulation circuit 22 is interrupted on the upstream side and the downstream side of the turbine 26.

At this time, in association with the transitions of the on-off valves 40A and 40B from the open state to the closed state, the sensor 72 detects state changes of the on-off valves 40A and 40B. Then, the relay 70 is opened by the relay driving circuit 71 and power is interrupted between the rectifier 29 and the system linking inverter 30. Thereby, thereafter, the operator can safely perform an operation even when he or she touches the turbine 26, the power generator 28, and the rectifier 29 of the power generation unit 50A.

Then, after a medium recovery device 100 for recovering the medium is connected to the service port 42 of the port pipe 41, the on-off valve 43 is opened. Thereby, in the medium circulation circuit 22, the medium between the on-off valves 40A and 40B is recovered.

Thereafter, necessary maintenance is performed on the turbine 26. As the maintenance, for example, exchange of a seal material, inspection for damage of a blade or repair of a damaged part, inspection, replacement, and the like of various sensors, and the like are included. Also, here, maintenance content of the turbine 26 is not limited in any way.

After the maintenance of the turbine 26 ends, the inside of the medium circulation circuit 22 between the on-off valves 40A and 40B is evacuated by connecting the vacuum pump to the service port 42 and operating the vacuum pump 110. The on-off valve 43 is closed after evacuation is performed to a predetermined specific vacuum degree in the vacuum pump 110.

Then, the medium supply device 120 is connected to the service port 42 and the medium is filled within the medium circulation circuit 22 by opening the on-off valve 43.

After the filling of the medium, the on-off valve 43 is closed and then the on-off valves 40A and 40B are opened. Because the detection signal from the sensor 72 is transitioned from the open state to the closed state as a result, the relay 70 is closed through the relay driving circuit 71, power is connected between the rectifier 29 and the system linking inverter 30, and a current is applied to the power generation unit 50A.

Thereby, because the power generation unit 50A is in a reactivatable state, the pump (not illustrated) of the heat medium circuit 21 and the circulation pump 23 of the medium circulation circuit 22 is operated, and the power generation unit 50A is reactivated in a predetermined procedure.

According to the above-described configuration, when maintenance is performed on one power generation unit while the other power generation units are operated in the power generation system 20A including the plurality of power generation units 50A, 50B, 50C, . . . , the on-off valves 40A and 40B of the operating unit to be operated during maintenance are closed and then current application to the turbine 26, the power generator 28, and the rectifier 29 is interrupted using the closing of the on-off valves 40A and 40B as a trigger. Because operations of the on-off valves 40A and 40B are reliably performed in the maintenance of the turbine 26 and the current application is automatically interrupted through the operation, forgetting an operation, an operational error, or the like is prevented and a safe working environment can be secured.

In addition, the on-off valves 40A and 40B are provided on the upstream side and the downstream side of the turbine 26 serving as a maintenance target in the medium circulation circuit 22 and the service port 42 is further provided between the on-off valves 40A and 40B. Thereby, closing the on-off valves 40A and 40B and charging and discharging the medium in a limited partial section including the turbine 26 between the on-off valves 40A and 40B in the medium circulation circuit 22 are performed during the maintenance of the turbine 26. Accordingly, a time required for the extraction of the medium, the evacuation, and the filling of the medium can be shortened and an operating rate of a power generation system can be improved by shortening a maintenance period. In addition, maintenance cost can be suppressed by reducing a necessary amount of the medium in maintenance.

(Modified Example of First Embodiment)

Also, although the operations of the on-off valves 40A and 40B are used as a trigger for interrupting current application to the rectifier 29 in the maintenance of the turbines 26 in the above-described embodiment, the present invention is not limited thereto. Also, as long as the operating unit is surely operated before maintenance in the maintenance of the turbine 26, the current application to the rectifier 29 may be interrupted by using an operation situation detected by the sensor 72 as the trigger.

For example, a door of a turbine chamber in which the turbine 26 is housed, a door or cover of a control panel in which the control unit 35 is housed, a cover of the rectifier 29, and the like may be included as the operating unit available as such a trigger and their opening or closing states may be detected. Alternatively, a locking unit for locking the doors or covers may be designated as the operating unit and the locking and unlocking of the locking unit may be detected.

In addition, there is a switch for stopping the operation of the circulation pump 23, a switch of the pump or the on-off valve (none of which is illustrated) for stopping the heat medium supply from the heat medium circuit 21, and the like additionally as the operating unit, and the sensor 72 may detect ON and OFF of the switches and interrupt the current application to the rectifier 29.

A plurality of triggers are capable of being combined and used.

In addition, even when a switch for stopping the circulation pump 23 and the heat medium circuit 21 is operated when the circulation pump 23 or the heat medium circuit 21 is triggered, the delivery of the medium from the circulation pump 23 and the heat supply from the heat medium circuit 21 are not immediately stopped, the medium is expanded in the turbine 26, and power generation is performed by the power generator 28. Therefore, the rotation of the turbine 26 or the power generator 28 may be detected and the current application to the rectifier 29 may be interrupted at a point in time at which the rotation has stopped. However, in this case, not only during maintenance but also during a normal operation, the rotation of the turbine 26 or the power generator 28 may be stopped when the heat energy supply from the heat source has been stopped or the like. Accordingly, in case that the interruption of current application to the rectifier 29 is performed by detecting that the rotation of the turbine 26 or the power generator 28 has been stopped, a state change in the above-described operating unit which is surely operated in the maintenance of the turbine 26 is also necessary to be detected to perform the interruption of current application to the rectifier 29.

In addition, even when power is interrupted between the rectifier 29 and the system linking inverter 30 by the relay 70 as described above, the current application may be supplied to the rectifier 29 from the power generator 28 and the rectifier 29 may be damaged if the turbine 26 is not completely stopped and power generation continues in the power generator 28.

Therefore, a relay 75 may also be provided between the power generator 28 and the rectifier 29 in addition to the relay 70, and the relay 70 and the relay 75 may be linked and operated. In addition, the function of the relay 75 may be implemented by a switching element mounted on a substrate of the rectifier 29.

Further, the doors of a building in which the turbine 26 is housed or a control panel in which the rectifier 29 is housed may be locked linked with the current application to the rectifier 29 so that the doors are not opened until the current application to the rectifier 29 is not interrupted during maintenance of the turbine 26 as described above.

Also, although the connection and disconnection of the relay 70 by the relay driving circuit 71 in association with the opening or closing of the on-off valves 40A and 40B is assumed to be implemented through an electrical determination circuit in the configuration shown in the above-described embodiment, the control unit 35 is also able to control the connection and disconnection of the relay 70 based on an opening and closing signal of the sensor 72 in software in place of the electrical determination circuit.

In addition, the control unit 35 is able to monitor whether an opening and closing state of the relay 70 has been actually switched by operation of the relay 70 when the relay driving circuit 71 switches opening and closing of the relay 70. Then, when the opening and closing state has not been correctly transitioned, the control unit 35 may output an alarm signal or stop the power generation system 20A.

Although the rectifiers 29 of the plurality of power generation units 50A, 50B, 50C, . . . are configured to be connected to one system linking inverter 30 in the above-described first embodiment, the present invention is not limited thereto. For example, each rectifier 29 of the plurality of power generation units 50A, 50B, 50C, . . . may be provided with the system linking inverter 30.

Although an example of the turbine 26 has been shown as the device serving as the maintenance target in the above-described embodiment, the present invention is not limited thereto. Any device constituting the power generation system 20A can be designated as the maintenance target in addition to the turbine 26.

(Second Embodiment)

Next, the second embodiment of the power generation system according to the present invention will be described. Also, in the second embodiment to be described below, the same reference signs are assigned to components common with the above-described embodiment in the drawings and description thereof will be omitted.

Figure 2:
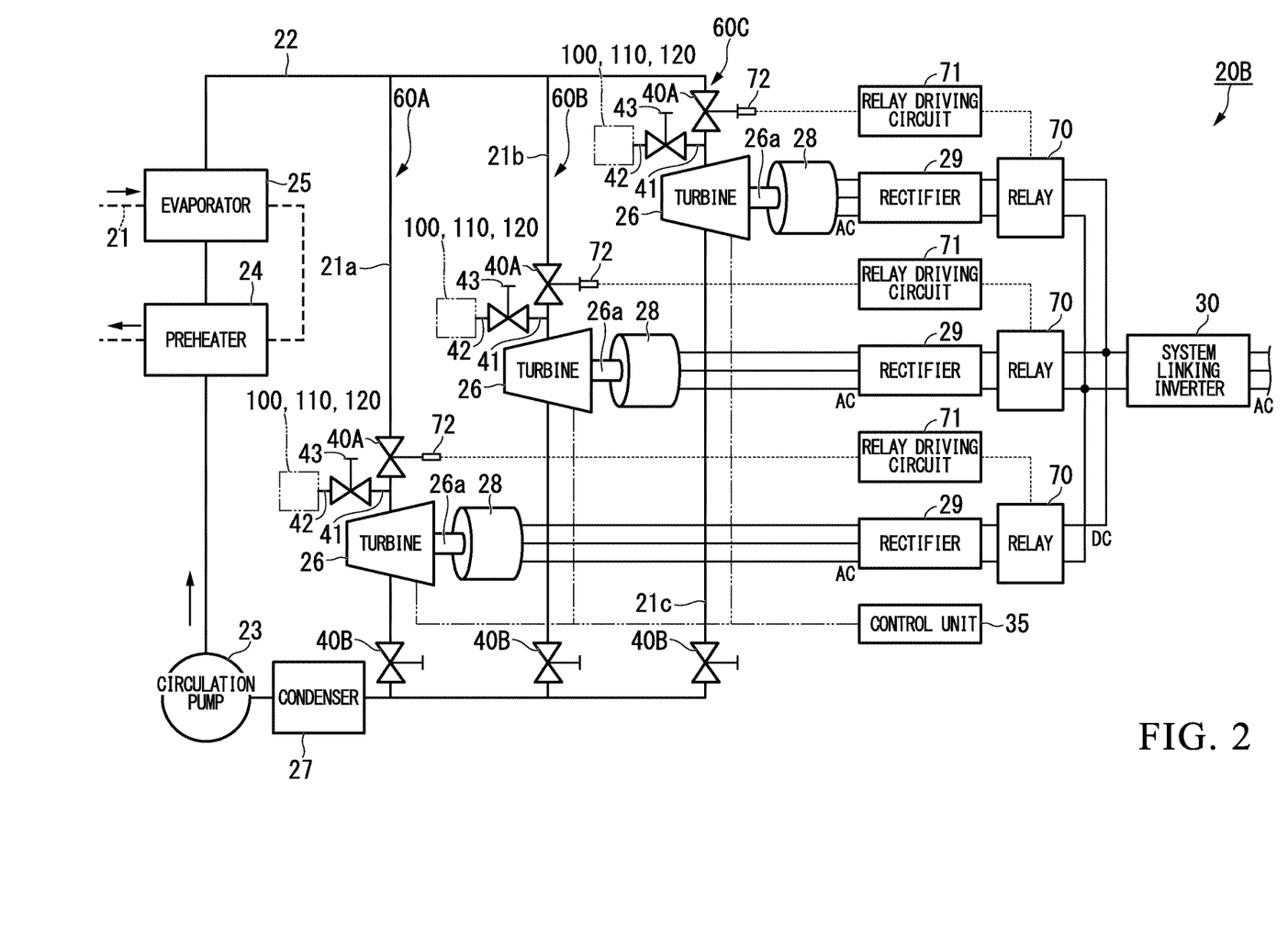
FIG. 2 is a diagram illustrating a configuration of a power generation system according to a second embodiment of the present invention.

As illustrated in FIG. 2, the power generation system 20B according to this embodiment includes a plurality of power generation units 60A, 60B, 60C, . . .

In the power generation system 20B, one medium circulation circuit 22, one circulation pump 23, one preheater 24, one evaporator 25, and one condenser 27 are provided for one heat medium circuit 21 and the heat medium circuit 21 is branched into a plurality of branch pipes 21a, 21b, 21c, . . . between the evaporator 25 and the condenser 27. Then, a turbine 26, a power generator 28, and a rectifier 29 are provided in each of the branch pipes 21a, 21b, 21c, . . . , and therefore the power generation units 60A, 60B, 60C, . . . are formed.

Then, the rectifiers 29 of the plurality of power generation units 60A, 60B, 60C, . . . are connected to one system linking inverter 30.

In the power generation system 20B of such a configuration, the medium pumped by the circulation pump 23 is branched into the branch pipes 21a, 21b, 21c, . . . of the power generation units 60A, 60B, 60C, . . . after passing through the preheater 24 and the evaporator 25 within the medium circulation circuit 22. This medium sequentially passes through the condenser 27 and returns to the circulation pump 23 after the turbine 26 is driven and power is generated by the power generator 28 in each of the power generation units 60A, 60B, 60C, . . .

Then, in the system linking inverter 30, AC output from rectifiers 29 of the plurality of power generation units 60A, 6013, 60C, . . . are re-converted into DC and the DC are output as generated power to an external power transmission network.

Even in this power generation system 20B, as in the above-described first embodiment, a power generation amount is able to be changed step by step by changing the number of units to be operated among the plurality of power generation units 60A, 60B, 60C, . . . based on a heat energy amount of the heat medium sent from the heat medium circuit 21 or a required power amount in the output side through control of the control unit 35.

In the above-described power generation system 20B, in each of the power generation units 60A, 60B, 60C, . . . , on-off valves 40A and 40B are provided on the upstream side and the downstream side of a device, for example, the turbine 26, serving as the maintenance target as in the above-described first embodiment. In addition, in the medium circulation circuit 22, a port pipe 41 having a service port 42 and an on-off valve 43 is provided between the on-off valves 40A and 40B.

In each of the power generation units 60A, 60B, 60C, . . . , a relay 70 for connecting and disconnecting power between the rectifier 29 and the system linking inverter 30 is provided between the rectifier 29 and the system linking inverter 30.

In a relay driving circuit 71, the relay 70 detects the transition of a detection signal of a sensor 72 provided in at least one of the on-off valves 40A and 40B and therefore connection and disconnection of power is switched in linkage with the on-off valves 40A and 40B.

In each of the power generation units 60A, 60B, 60C, . . . , the on-off valves 40A and 40B are closed in the unit (for example, the power generation unit 60A) having the turbine 26 serving as the maintenance target among the plurality of power generation units 60A, 60B, 60C, . . . so as to perform maintenance of the turbine 26 as shown in the above-described first embodiment. At this time, the sensor 72 detects the shifts of the states of the on-off valves 40A and 40B in association with the shifts of the on-off valves 40A and 40B from the open state to the closed state. Then, the relay 70 is opened through the relay driving circuit 71 and power is interrupted between the rectifier 29 and the system linking inverter 30. Thereby, the operator can safely perform an operation thereafter even when he or she touches the turbine 26, the power generator 28, and the rectifier 29 of the power generation unit 60A.

Then, after a medium recovery device 100 for recovering the medium is connected to the service port 42 of the port pipe 41, the on-off valve 43 is opened. Thereby, the medium between the on-off valves 40A and 40B is recovered.

Thereafter, necessary maintenance is performed on the turbine 26. Then, the inside of the medium circulation circuit 22 between the on-off valves 40A and 40B is evacuated by connecting a vacuum pump 110 to the service port 42 after the maintenance of the turbine 26 ends, and the on-off valve 43 is closed after evacuation is performed to a predetermined specific vacuum degree. Then, a medium supply device 120 is connected to the service port 42 and the medium is filled within the medium circulation circuit 22 by opening the on-off valve 43.

After the filling of the medium, the on-off valve 43 is closed and then the on-off valves 40A and 40B are opened. Because the detection signal from the sensor 72 is transitioned from the open state to the closed state as a result, the relay 70 is closed through the relay driving circuit 71, power is connected between the rectifier 29 and the system linking inverter 30, and a current is applied to the rectifier 29. From this state, the power generation unit 60A is reactivated.

Even in the above-described configuration, as in the above-described first embodiment, for example, when the power generation units 60B, 60C, . . . are continuously operated and maintenance is performed on the turbine 26 of the power generation unit 60A, the on-off valves 40A and 40B of the power generation unit 60A are closed and therefore the current application to the power generation unit 60A is interrupted using the closing of the on-off valves 40A and 40B as the trigger. Because operations of the on-off valves 40A and 4013 are surely performed in the maintenance of the turbine 26 and the current application to the power generation unit 60A is automatically interrupted through the operations, a safe working environment is ensured without an operation being forgotten, an operational error occurring, or the like.

In addition, in each of the power generation units 60A, 60B, 60C, . . . , closing the on-off valves 40A and 4013 and removing and inserting the medium only in a partial section including the turbine 26 between the on-off valves 40A and 40B in the medium circulation circuit 22 are performed during the maintenance of the turbine 26. Accordingly, a time required for the extraction of the medium, the evacuation, and the filling of the medium can be shortened and an operating rate of a power generation system can be improved by shortening a maintenance period. In addition, maintenance cost can be suppressed by reducing a necessary amount of the medium in maintenance.

Also, a modified example similar to the modified example of the above-described first embodiment is also applicable to the power generation system 20B in this embodiment.

(Third Embodiment)

Next, the third embodiment of the power generation system according to the present invention will be described. Also, the third embodiment to be described below, for example, has a system configuration based on the configuration shown in the above-described first embodiment, the same reference signs are assigned to components common with the above-described first embodiment in the drawings, and description thereof will be omitted. In addition, although only one power generation unit 50A is shown in FIG. 3 used in the following description, the power generation system 20C includes a plurality of power generation units 50B, 50C, . . . similar to the power generation unit 50A as in the above-described first embodiment illustrated in FIG. 1.

Figure 3:
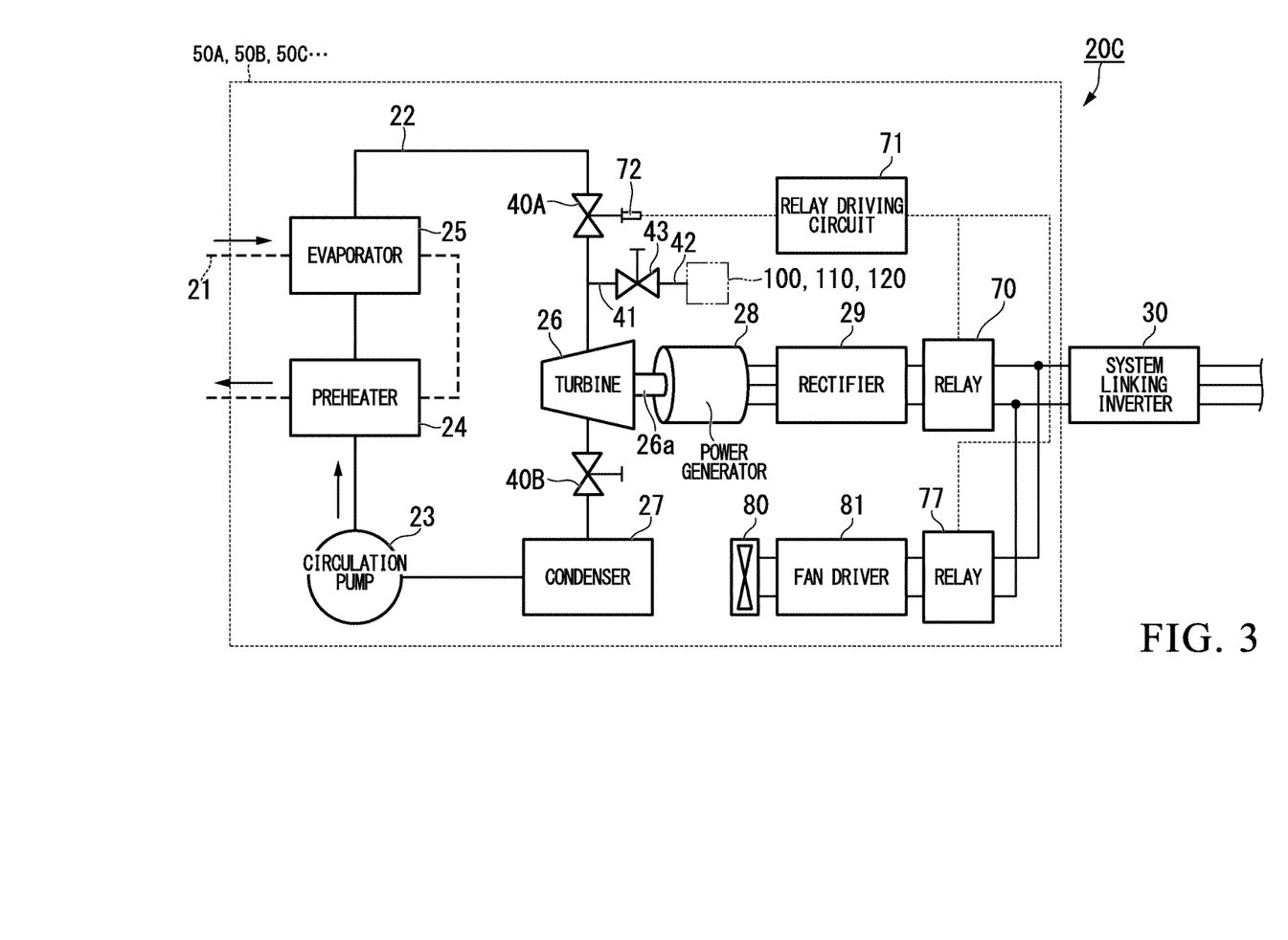
FIG. 3 is a diagram illustrating a configuration of a power generation system according to a third embodiment of the present invention.

As illustrated in FIG. 3, the power generation system 20C according to this embodiment includes a fan 80 configured to cool a condenser 27 so as to increase condensation efficiency in the condenser 27.

The fan 80 is rotated and driven through a fan driver 81 including a motor in which a DC obtained from a rear flow side of the rectifier 29 is used as a power source. The efficiency of the condenser 27 is increased by applying wind generated through rotation of the fan 80 to the condenser 27.

In each power generation unit 50A, 50B 50C . . . , a relay (second relay) 77 configured to connect and disconnect power between the fan driver 81 and the system linking inverter 30 is provided between the fan driver 81 and the system linking inverter 30.

As shown in the above-described first embodiment, this relay 77 interrupts power between the fan driver 81 and the system linking inverter 30 through the sensor 72 and the relay driving circuit 71 in association with closing operations of the on-off valves 40A and 40B in the maintenance of the turbine 26.

Thereby, in the maintenance of the turbine 26, the safety of an operation can be ensured by stopping the fan 80 configured to cool the condenser 27.

Also, in such a configuration, the control unit 35 may monitor temperatures of the medium before and after the turbine 26 and continue cooling of the condenser 27 by operating the fan 80 until the temperature of the medium is decreased to a predetermined specific temperature or less without immediately opening the relay 77 even when the on-off valves 40A and 40B are closed when the temperature is high. In this case, alarm display or an alarm sound indicating that the fan 80 operates may be output by the control unit 35 for the operator until the temperature of the medium is decreased to the specific temperature or less and the relay 77 is opened.

In addition, the fan 80 for cooling the above-described condenser 27, the fan driver 81, the relay 77, and the operation of the relay 77 can be similarly applied to the configuration shown in the above-described second embodiment.

(Other Embodiments)

Also, the power generation system of the present invention is not limited to the above-described embodiments described with reference to the drawings and various modified examples are possible within the technical scope of the invention.

For example, although exhaust heat from ships, factories, gas turbines, and the like, terrestrial heat, solar heat, temperature difference between cooler deep and warmer shallow ocean waters, and the like are configured to be used as a heat source for power generation in the power generation systems 20A and 20B of the above-described embodiments, any type of heat source is can be used.

In addition, although an example of the turbine 26 has been shown as the expander in the above-described embodiments, a scroll type expander or the like may be used in place of the turbine 26.

Further, a procedure in the maintenance may be appropriately changed without departing from the scope of the subject matter of the present invention.

In addition, as long as the power generator 28 is driven by supplying a working medium to the turbine 26 (expander), even in a configuration in which neither the heat medium circuit 21 nor the medium circulation circuit 22 is provided, the present invention is applicable to a power generation system having any configuration.

In addition to this, any of the configurations included in the above-described embodiments may be omitted or changed to other configurations without departing from the spirit or scope of the present invention.

INDUSTRIAL APPLICABILITY

According to the above-described power generation system, power supply to a power generation unit is able to be surely interrupted and a maintenance operation is able to be safely performed when maintenance of a device is performed.

REFERENCE SIGNS LIST 20A, 20B Power generation system
21 Heat medium circuit
21a, 21b, 21c Branch pipe
22 Medium circulation circuit (medium distribution system)
23 Circulation pump
24 Preheater
25 Evaporator
26 Turbine (expander)
26a Driving shaft
27 Condenser
28 Power generator
29 Rectifier
30 System linking inverter 35 Control unit
40A On-off valve (first on-off valve)
40B On-off valve (second on-off valve)
41 Port pipe
42 Service port (port)
43 On-off valve (third on-off valve)
50A, 50B, 50C Power generation unit
60A, 60B, 60C Power generation unit
70 Relay
71 Relay driving circuit (relay driving unit)
72 Sensor
75 Relay
77 Relay (second relay)
80 Fan
81 Fan driver
100 Medium collection device
110 Vacuum pump
120 Medium supply device

The invention claimed is:

1. A power generation system comprising a plurality of power generation units which are provided in parallel to an external power system,
wherein each of the power generation units comprises:
an expander configured to be rotated by a working medium;
a power generator configured to generate power through the rotation of the expander;
a rectifier configured to rectify the power generated by the power generator and output the rectified power to the external power system;
a medium distribution system configured to pump the working medium into the expander;
a relay configured to interrupt power between the power generator and the external power system;
an operating unit configured to be operated when maintenance of the power generation unit starts; and
a relay driving unit configured to interrupt power between the power generator and the external power system by the relay based on an operation state in which the operating unit has been operated.

2. The power generation system according to claim 1,
wherein the medium distribution system is a medium circulation circuit configured to circulate the working medium, and
wherein the medium circulation circuit comprises:
a circulation pump configured to pressurize the working medium and circulate the pressurized working medium through the medium circulation circuit;
an evaporator configured to heat and evaporate the pressurized working medium using an external heat source; and
a condenser configured to condense the working medium discharged from the expander.

3. The power generation system according to claim 2, further comprising:
a first on-off valve provided on an upstream side of a flowing direction of the working medium with respect to a maintenance target device including at least one of the circulation pump, the evaporator, the expander, and the condenser in the medium circulation circuit to interrupt the distribution of the working medium; and
a second on-off valve provided on a downstream side of the flowing direction of the working medium with respect to the maintenance target device in the medium circulation circuit to interrupt the distribution of the working medium,
wherein at least one of the first on-off valve and the second on-off valve is the operating unit.

4. The power generation system according to claim 3, wherein at least one of the circulation pump and a pump configured to feed a heat medium from the external heat source to the evaporator is the operating unit.

5. The power generation system according to claim 4, further comprising:
a cooling fan configured to cool the condenser;
a fan driving source configured to drive the cooling fan; and
a second relay configured to interrupt power between the fan driving source and a power supply of the fan driving source,
wherein the relay driving unit interrupts the power between the fan driving source and the power supply of the fan driving source by the second relay when the operating unit has been operated.

6. The power generation system according to claim 3, further comprising:
a cooling fan configured to cool the condenser;
a fan driving source configured to drive the cooling fan; and
a second relay configured to interrupt power between the fan driving source and a power supply of the fan driving source,
wherein the relay driving unit interrupts the power between the fan driving source and the power supply of the fan driving source by the second relay when the operating unit has been operated.

7. The power generation system according to claim 2, wherein at least one of the circulation pump and a pump configured to feed a heat medium from the external heat source to the evaporator is the operating unit.

8. The power generation system according to claim 7, further comprising:
a cooling fan configured to cool the condenser;
a fan driving source configured to drive the cooling fan; and
a second relay configured to interrupt power between the fan driving source and a power supply of the fan driving source,
wherein the relay driving unit interrupts the power between the fan driving source and the power supply of the fan driving source by the second relay when the operating unit has been operated.

9. The power generation system according to claim 2, further comprising:
a cooling fan configured to cool the condenser;
a fan driving source configured to drive the cooling fan; and
a second relay configured to interrupt power between the fan driving source and a power supply of the fan driving source,
wherein the relay driving unit interrupts the power between the fan driving source and the power supply of the fan driving source by the second relay when the operating unit has been operated.

* * * * *